United States Patent [19]
Taylor

[11] Patent Number: 5,245,458
[45] Date of Patent: Sep. 14, 1993

[54] OPTICAL INTERCONNECT NETWORKS

[75] Inventor: Michael G. Taylor, Blackpool, United Kingdom

[73] Assignee: British Telecommunications public limited company, London, England

[21] Appl. No.: 743,335

[22] PCT Filed: Feb. 22, 1990

[86] PCT No.: PCT/GB90/00283
§ 371 Date: Aug. 26, 1991
§ 102(e) Date: Aug. 26, 1991

[87] PCT Pub. No.: WO90/10358
PCT Pub. Date: Sep. 7, 1990

[30] Foreign Application Priority Data

Feb. 24, 1989 [GB] United Kingdom ............... 8904281

[51] Int. Cl.[5] .................... G02F 3/00; G06E 1/00; H04J 15/00
[52] U.S. Cl. .................... 359/108; 359/109; 359/115; 359/117
[58] Field of Search .............. 359/107, 108, 109, 117, 359/121, 127, 128, 135, 157, 164, 167, 115, 138, 139

[56] References Cited

U.S. PATENT DOCUMENTS

| | | | |
|---|---|---|---|
| 4,837,855 | 6/1989 | Hajikano et al. | 359/117 |
| 4,931,959 | 6/1990 | Brenner et al. | 359/107 X |
| 5,010,542 | 4/1991 | Pfaff | 359/109 X |

FOREIGN PATENT DOCUMENTS 0282227 9/1988 European Pat. Off. .
3423221 11/1984 Fed. Rep. of Germany .
WO88/07313 9/1988 PCT Int'l Appl. .

OTHER PUBLICATIONS

Lin, Shing-Hong, et al., "2-D Optical Multistage Interconnection Networks", *SPIE Digital Optical Computing*, vol. 752, (1987), pp. 209-216.
Midwinter, J. E., "Novel approach to the design of optically activated wideband switching matrices", IEE Proceedings, vol. 134, No. 5, Oct. 1987, pp. 261-268.
Granestrand et al., "Strictly Nonblocking 8×8 Integrated Optical Switch Matrix," *Electronics Letters*, Jul. 17th, 1986, vol. 22, No. 15, pp. 816-818.

*Primary Examiner*—Bruce Y. Arnold
*Assistant Examiner*—David R. Parsons
*Attorney, Agent, or Firm*—Nixon & Vanderhye

[57] ABSTRACT

An optical interconnect network has four stages ($S_4$ to $S_7$) each formed from two-dimensional perfect shuffle interconnect stage (6) and a two-dimensional array of processing modules (8) each of which has a two-dimensional array of inputs and outputs. The use of two-dimensional modules provides an increase in optical channels which can be processed compared to the equivalent one-dimensional modules. The modules can perform switching functions.

7 Claims, 6 Drawing Sheets

OPTICAL INTERCONNECT NETWORKS

Many one dimensional (linear) networks have been proposed for a variety of purposes which have a number of parallel channels which are processed by several distinct stages in a pipelined manner. Each stage can be split into two parts: an interconnect stage where the lines are permuted followed by a layer of two-input two-output processing modules which operates on adjacent pairs of data channels.

Recently, efficient optical computers have been proposed which are networks where the interconnect part is performed using optics and the module part in some other medium, for example a chip of lithium niobate directional couplers (P. Granestrand et al, "Strictly non-blocking 8×8 integrated optical switch matrix" Electron. Lett. 22 No. 15 (1986)) or an optoelectronic integrated circuit (J. E. Midwinter, "Novel approach to optically activated wideband switching matrices" IEEE Proc. J 134 261 (1987)). Such machines have the physical layout described above. The use of optics for the interconnect stage has the advantages of high bandwidth, zero time skew and low crosstalk which give the whole processor a high throughout of parallel data. The various interconnection patterns which the networks employ can be generated using bulk or holographic optical components. Such an arrangement does not, however, take full advantage of the parallelism possible with optical systems.

Shing-Hong Lin et al in an article entitled "2-D Optical Multistage Interconnection Networks", SPIE Vol 752 Digital Optical Computing (1987) pp 209-216, describe the use of 2-D networks employing 2-D perfect shuffles interconnects and 2-D four-input, four output processing modules. Lin et al give no indication of the control structure necessary to achieve any particular network interconnection but rather point out that full, 24 cross-bar switches can in principle achieve a desired configuration.

It is an object of the present invention to provide an optical interconnect network having less structural complexity than such known 2-D networks. Accordingly an optical interconnect network comprises at least one stage which has an optical interconnect stage connecting a two-dimensional array of interconnect input ports to a two-dimensional array of interconnect output ports and an array of optical processing modules each having a two-dimensional array of module input ports, optically coupled to a respective interconnect output port, and a two dimensional array of module output ports characterised in that each module is functionally identical to a first and a second pair of two-input, two-output processing sub-modules in which each input of each of the second pair of processing sub-modules is connected to an output of a respective distinct one of the first pair of processing sub-modules.

The two dimensional network can be assembled using optics, with similar performance as before. There is a limit to the number of channels which can be accommodated which is proportional to either the maximum width of he module element or to the distance across which the optics can image faithfully. If this limit is N channels in the case of a one dimensional network then it becomes $N^2$ for a two dimensional one. A further advantage of a network according to the present invention is that a network of a given size can be built much more compactly in a two dimensional form.

Because the present invention requires only a sufficient number of processing elements as are necessary to carry out the same processing as the four sub-modules, the structural complexity is reduced from that required to provide a full 4×4 processing yet, as will be shown later, it can be functionally identical to a concatenation of the processing modules of a one dimensional network and have the same control structure.

The present invention therefore allows the use of one dimensional network control structure with two-dimensional optical networks.

An embodiment of the present invention will now be described, by way of example only, with reference to the accompanying drawings, of which:

Figure 1:
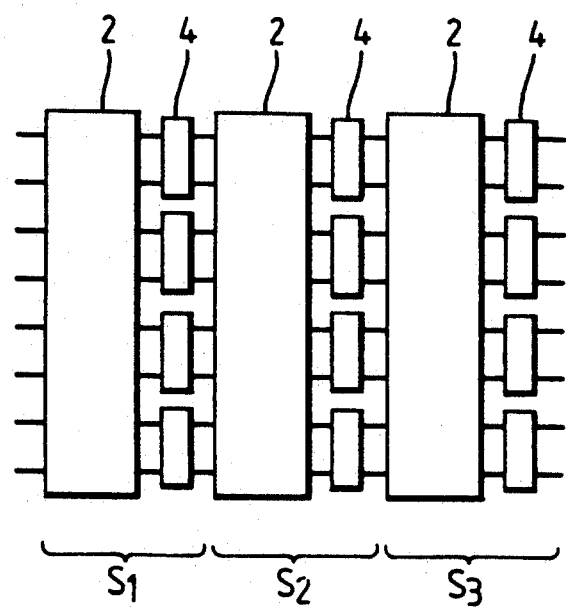
FIG. 1 is a schematic generalised diagram of prior art one-dimensional networks.

Referring to FIG. 1 is a generalised one-dimensional, prior art interconnect network comprises three stages $S_1$-$S_3$ each having a one-dimensional interconnect stage 2 and a layer of two-input, two-output processing modules 4. The interconnections at each stage can be different as can the functions performed by the modules.

Figure 2A:
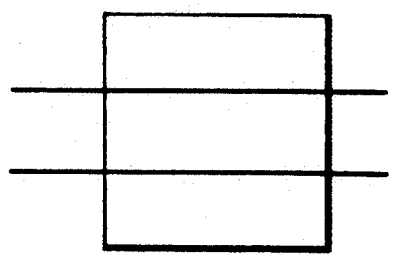
FIGS. 2a and 2b are schematic diagrams of an exchange and by-pass module used in an interconnection network as shown in FIG. 1.
Figure 2B:
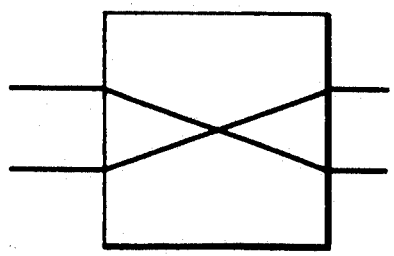

Networks which fall into the general description above can be made to do many parallel processing tasks. The most common function is to have a number of data streams at the input, and to have the output be the same data lines in a different order, the order to be determined by the settings of the modules, keeping the interconnections fixed. Such switching networks usually have regular interconnection patterns, and modules which sit in one of two states, as illustrated in FIGS. 2a and 2b, in which the two input lines are either exchanged or bypassed. A number of networks of this format exist each having a control structure to specify the setting of the modules to achieve a certain overall permutation.

Other classes of computers are possible when the modules perform additional processing. If the modules are AND gates and OR gates then a programmable logic array can be built by using perfect shuffle or butterfly interconnections. A fast Fourier transform machine has been proposed where the interconnections are perfect shuffles and the modules perform a weighted sum and difference calculation. These and other processes can be achieved in an optical two dimensional network of the configuration of the present invention.

Figure 3:
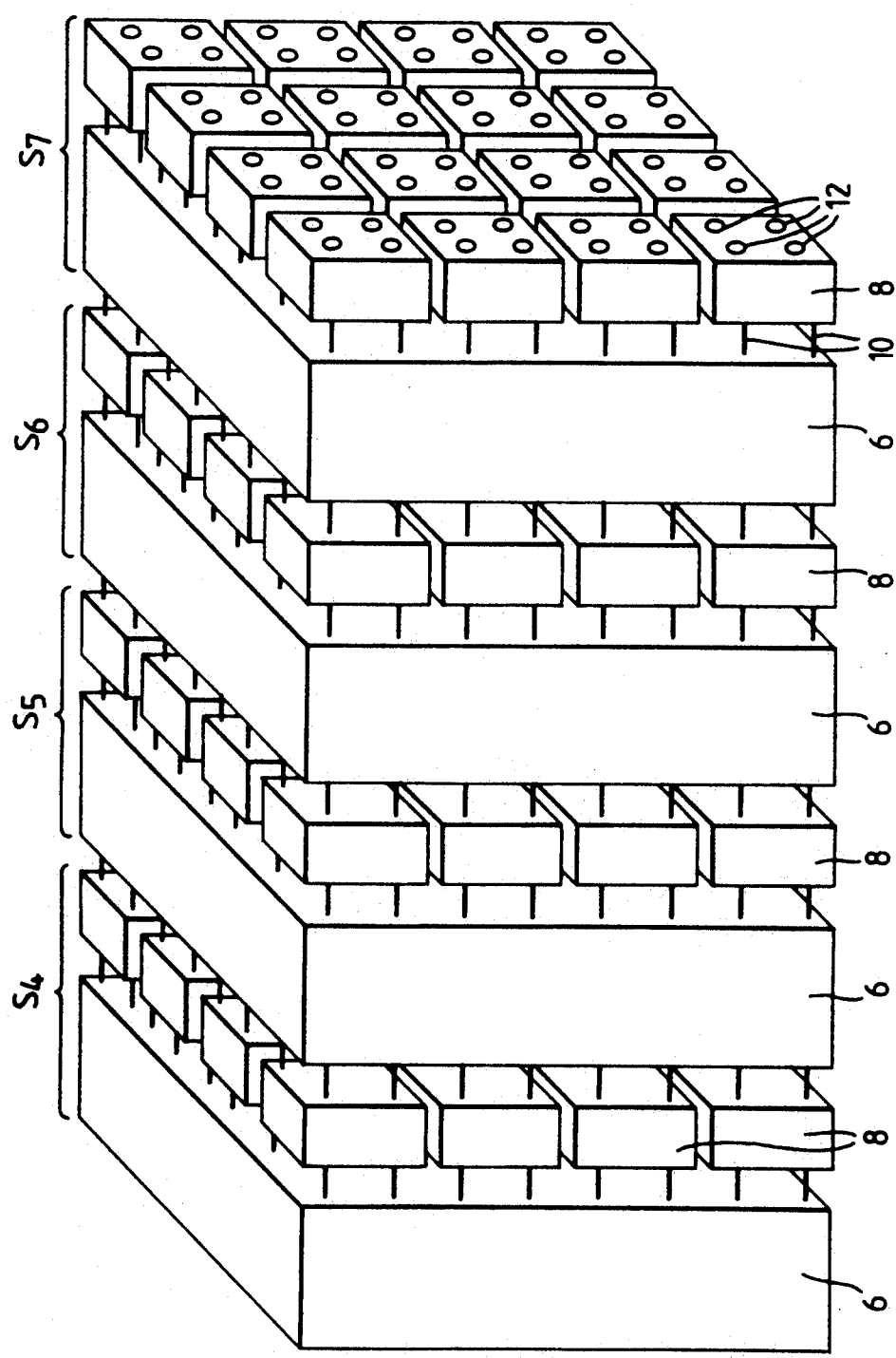
FIG. 3 is a schematic generalised diagram of an two dimensional interconnect network according to the present invention.

Referring now to FIG. 3, a two-dimensional optical interconnect network according to the present invention is shown in generalised form. It comprises three stages $S_4$ to $S_7$ each comprising one, two dimensional interconnect stage 6 followed by a two dimensional array of modules 8 each module having a two-dimensional array of four inputs 10 and four outputs 12. The interconnections 6 permute the incoming lines in two dimensions.

Figure 4:
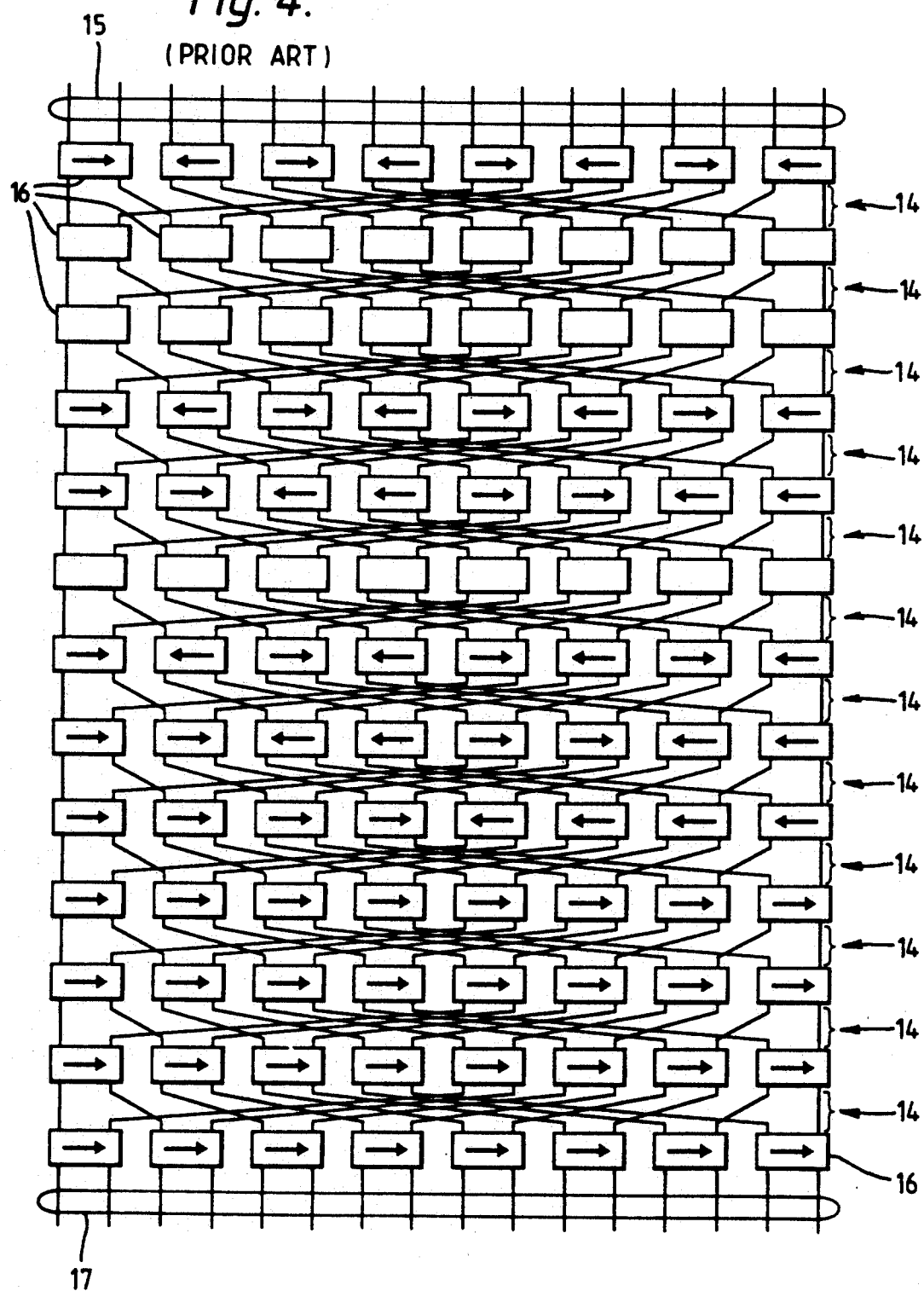
FIG. 4 is a schematic diagram of an exemplary one-dimensional network which can be configured as a two-dimensional network according to the present invention.

Referring now to FIG. 4 there is shown a known one-dimensional interconnect network (D. E. Knuth, "Sorting and Searching: Addison Wesley (1973)) which will be used by way of example to explain the steps by which a given one-dimensional network can be reconfigured to a two dimensional network according to the present invention.

The linear network depicted in FIG. 4 is a sorting network having interconnections 14 which are perfect shuffles and processing sub-modules 16 of which only exemplary ones are referenced for clarity. Several different numbers enter input lines 15; arrowed modules (16) output the higher number at the port pointed to, and unmarked modules 16 always bypass. The numbers emerging at outputs 17 are in numerical from left to right order.

Figure 5:
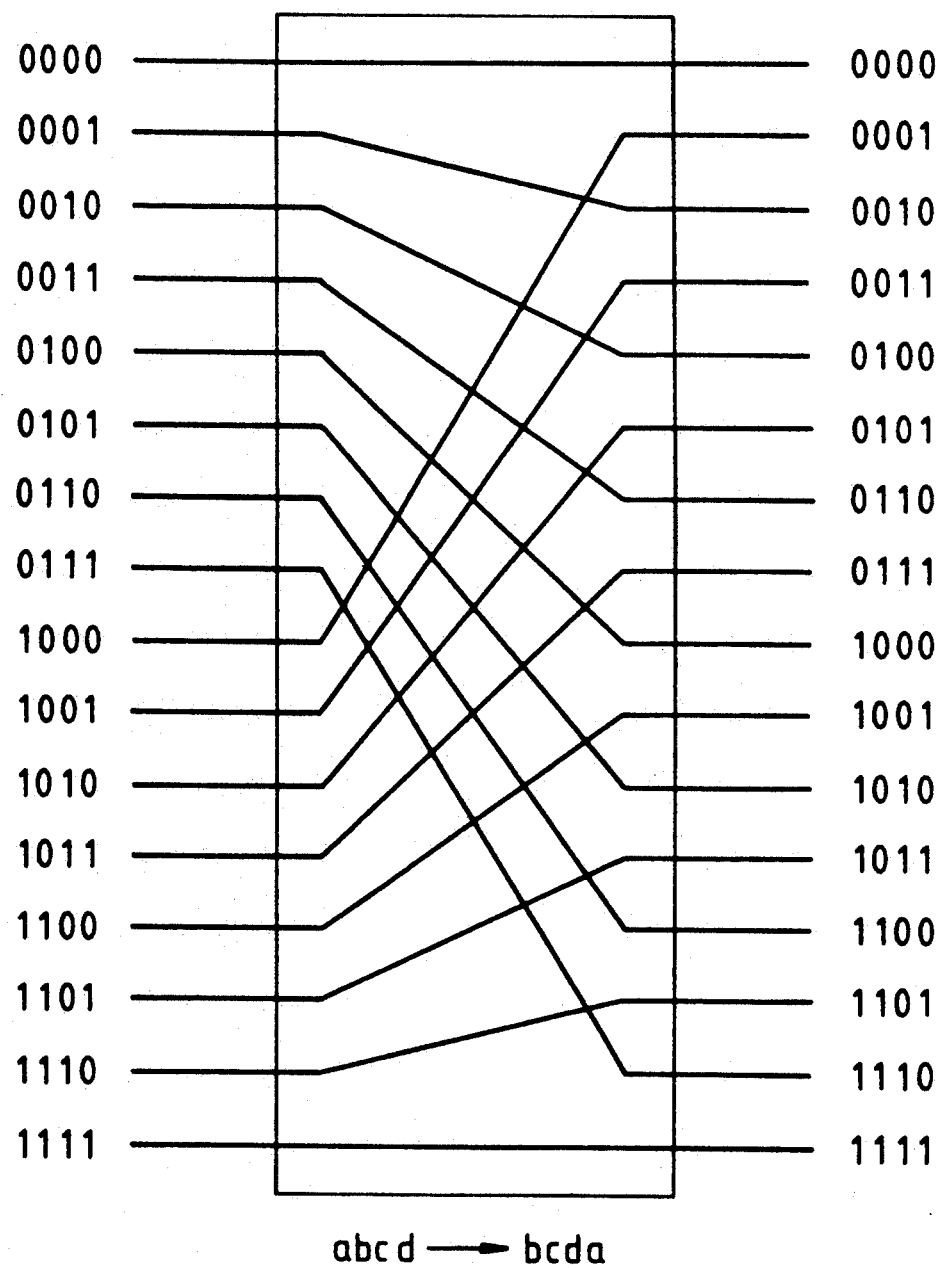
FIG. 5 is a schematic diagram of one of the modules of the FIG. 3 embodiment of the present invention when reproducing the functionality of the network of FIG. 4.

A perfect shuffle interconnection comprises the splitting of the stack of lines into two halves and interleaving them, as shown in FIG. 5.

If the $2^4$ ports labelled by the four binary bits abcd are shuffled it can be considered as the barrel rolling of the binary addresses of the ports. That is, the input port labelled abcd is shuffled to the output port addressed bcda. When a channel arrives at a module at port abcd it can leave from either abc0 or abc1 where the port it leaves depends on what the type of module is and on the destination address of the other channel arriving at the same module.

Consider now the routing effect of two consecutive stages of the sorting network: a line arriving at abcd is shuffled to bcda, exchanged or bypassed in a module (16 or 18) to bcdA where A can be 0 or 1, shuffled again to cdAb and finally switched to cdAB, again where B can be 0 or 1.

abcd
bcda
bcdA
cdAb
cdAB

The line has a choice of four output addresses AB=00, 01, 10 and 11. Also there are four incoming lines which might emerge from these four ports-those arriving from ab=00, 01, 10 and 11.

Consider now that the lines in the linear array are arranged in space into a square array according to the rule abcd"(column bd, row ac).

The function of the two stages of the 1D network can be performed by one of the stages of the 2D network shown in FIG. 3. The new interconnection is a 2D perfect shuffle which is a horizontal perfect shuffle followed by a vertical perfect shuffle. One of these permutations has the effect (bd, ac)→(db, ca)

which corresponds to two 1D shuffles in succession. The effect of the modules in the two consecutive stages of the linear network is to fix the two bits a and b in the address. A module in the two dimensional network operates on the four ports differing in the final bits of the row and column addresses, a and b again, so one 4×4 module can be made to do the same operations as all the relevant modules in the two stages on the old network. That is, by mapping the lines from a 1D to a 2D array according to the rule above, the work of two stages of the original network is done by one stage of the new network incorporating a 2D perfect shuffle, and hence a two dimensional network can be built up using this rule.

Figure 6:
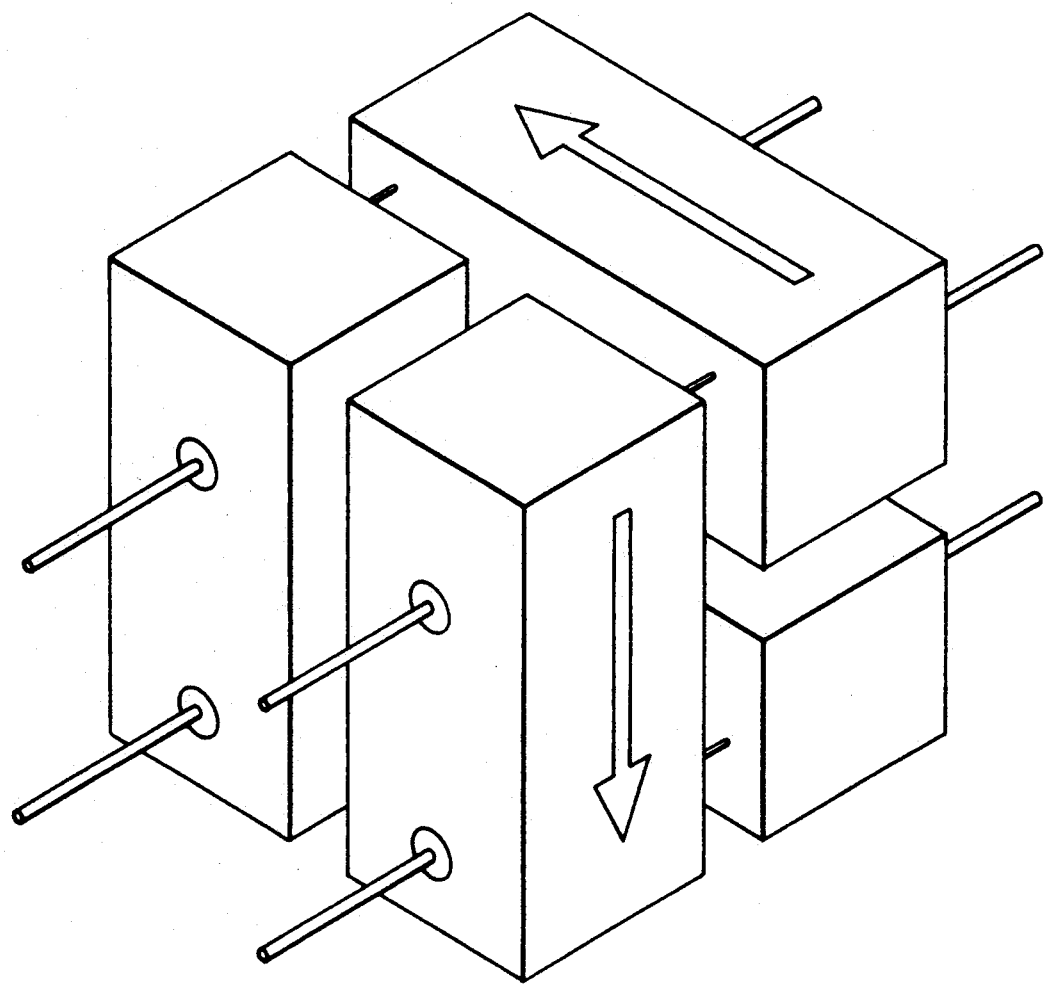
FIG. 6 is a schematic diagram to show the functional equivalence of a two dimensional processing module of the present invention to four one dimensional sub-modules.

Considering now the operation of a 2D module in more detail. Each links ports (do, co), (do, cl), (dl, co) and (dl, cl). First bit a is fixed, then bit b, so the module can be regarded as being split into four two-input, two-output sub-modules as in FIG. 6. These sub-modules are four of the modules in FIG. 4 moved in space, and it is readily deducible which four are associated in each module by using the mapping rule. The 2D module need not be physically separated into the four 2×2 sub-modules as long as the module as whole is functionally identical to such a concentration of sub-modules as shown in FIG. 6.

The exchange/bypass decisions of the original network generate a sorted output of the network, but the output of the equivalent 2D network will have the channel with the nth destination address at the port which is the mapping of port n in the linear array. This scrambling of lines is wholly determined in advance and is functionally unimportant; if it is required to sort into a more visible order then the destination addresses can be modified at the start, or equivalently the modules can be set according to the reverse-mapped addresses.

A single exemplary two dimensional network has been described above. The starting point was a one dimensional network. Consideration will now be given to whether and how any two dimensional network according to the present invention can be constructed from a linear one, independent of the function of the modules and the interconnection pattern.

In analogy to the treatment of the perfect shuffle sorting network above, two consecutive stages can be concatenated into one stage of a 2D network by regarding the modules as being moved around in space. It may not be possible for one interconnection followed by a layer of 4×4 modules to do the work of two, one dimensional stages comprising an interconnection, a 2×2 module as an interconnection and a final 2×2 module sequence. Whatever the function of the modules in FIG. 2 we know (referring now to FIG. 7) that the intermediate module output X' is a function of X and Y.

$X'=X'(X,Y)$ and similarly for three of the other intermediate outputs $Y'=Y'(X,Y)$ $W'=W'(W,Z)$ $Z'=Z'(W,Z)$ The final module outputs X" and Z" which are functions of X' and Z'

$X''=X''(X',Z')$ $$Z'=Z'(X',Z')$$

so, $$X''=X''(X,Y,Z,W)$$

$$Z''=Z''(X,Y,Z,W)$$

In order that the functions X" and Z" be calculated by one two dimensional, four-input four-output processing module, it is necessary for the other two outputs, Y" and W", to be functions of the same four inputs $$Y''=Y''(X,Y,Z,W)$$

$$W''=W''(X,Y,Z,W)$$

which can only be achieved if intermediate results Y' and W' meet at a common module.

$$Y''=Y''(Y',W')$$

$$W''=W''(Y',W')$$

This imposes a restriction on the second of the two interconnects of FIG. 6, which can be summarised as follows- The complement of a line emerging from a module is defined to be the other line coming out of it. For any two lines which are the two inputs to a module, the complements of these two lines must also meet at a common module.

Figure 7:
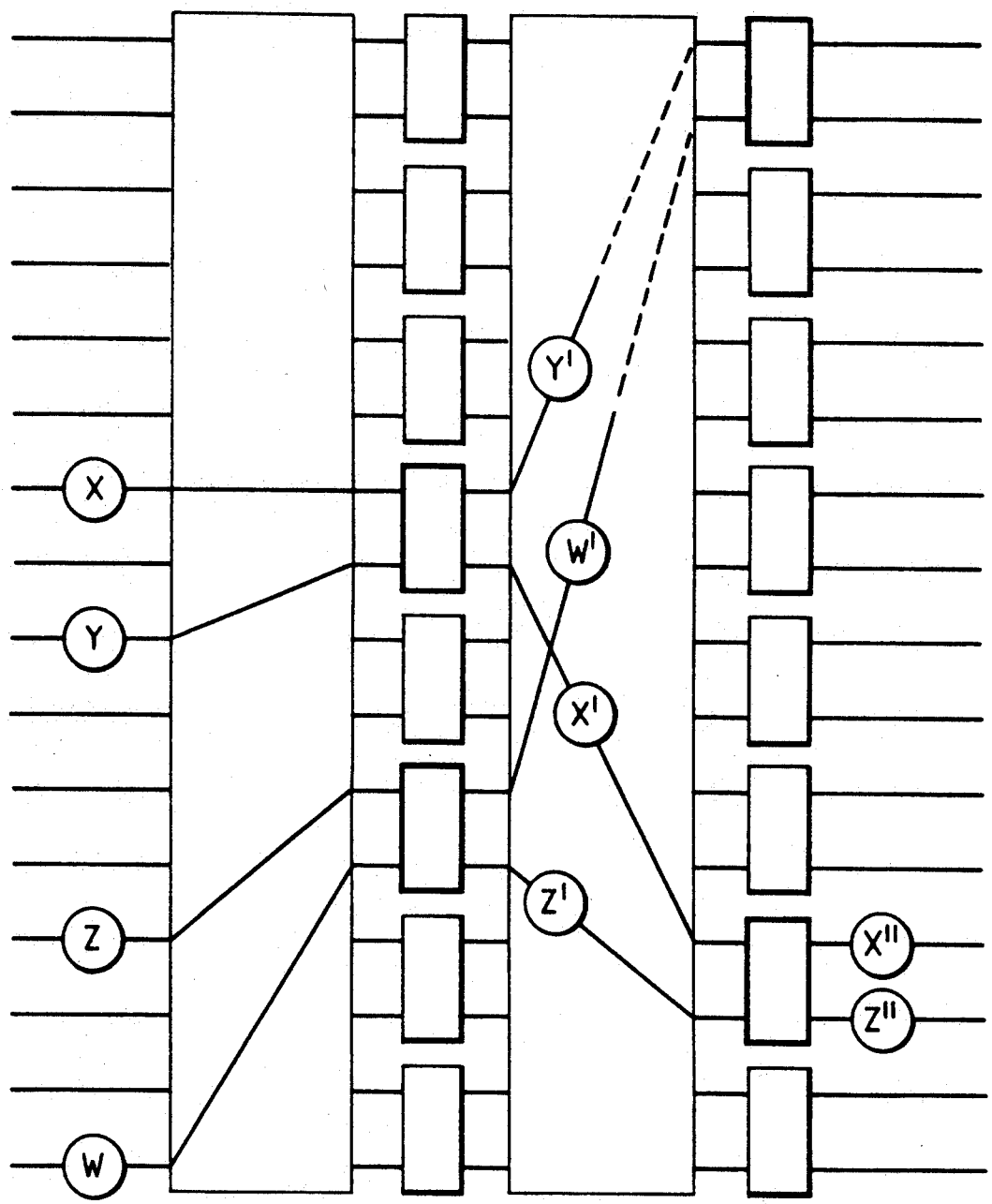
FIG. 7 is a schematic diagram illustrating the condition for which stages of a one-dimensional network can be concatenated to form a two-dimensional network according to the present invention.

If an interconnect does not satisfy this condition then it is not possible to concatenate the consecutive stages of FIG. 7 into the functionally identical single stage of two dimensional 4×4 modules according to the present invention.

In principle, for a network satisfying the interconnect condition as stated above, it is always possible to pick up the lines in the linear arrangement of FIG. 1 and move them into a two dimensional array as in FIG. 3. There will be many ways to do this mapping, but what is sought is a 2D interconnection which can readily be achieved using a simple optical arrangement. An example is the special mapping applied to the perfect shuffle network. If a successful mapping scheme can be found then the task of generating a 2D network out of its linear counterpart is complete.

I claim:

1. An optical interconnect network comprising:
   at least one stage which has an optical interconnect stage connecting a two-dimensional array of interconnect input ports to a two-dimensional array of interconnect output ports;
   an array of optical processing modules each module having a two-dimensional array of module input ports, optically coupled to a respective interconnect output port, and a two dimensional array of module output ports characterised in that
   each module defines a first and a second pair of two-input, two-output, processing sub-modules each of which performs a logic function on the data supplied to its two inputs and generates processed data on its two outputs and in which each input of each of the second pair of processing sub-modules is connected to a respective output of the first pair of processing sub-modules, and wherein the inputs of each second processing sub-module are connected to the outputs from different first processing sub-modules.

2. A network as in claim 1 in which each processing sub-module has two states, one state in which the inputs are exchanged, and a second state in which they are not exchanged.

3. A network as in claim 1 in which each processing sub-module performs weighted sum and difference calculations, the network being configured to perform a fast Fourier transform.

4. A network as in claim 1 in which the interconnection stage performs a perfect 2-D shuffle between the interconnect input ports and interconnect output ports.

5. A network as in claim 1 in which each sub-module defines an AND or an OR operation whereby the network comprises a programmable logic array.

6. A two-dimensional optical signal interconnect network comprising:
   a two-dimensional array of two-dimensional optical signal processing modules;
   each of said modules having four input ports and four output ports and including optical signal processing means including a first pair of one-dimensional two-input, two-output optical signal processors cascaded with a second pair of one-dimensional two-input, two output optical signal processors, an output from each of the first processors being connected to a respective input of each of the second processors.

7. A network as in claim 6 wherein each one-dimensional processor is capable of passing signals presented on two inputs a, b to its two outputs a', b' either in the same order a', b' or in exchanged order b', a'.

* * * * *